United States Patent [19]

Horikawa et al.

[11] Patent Number: 4,638,156

[45] Date of Patent: Jan. 20, 1987

[54] LIGHT BEAM SCANNING APPARATUS WITH ADJUSTABLE SCANNING SPEED AND OFFSET

[75] Inventors: Kazuo Horikawa; Yuji Ohara, both of Kanagawa, Japan

[73] Assignee: Fuji Photo Film Co., Ltd., Kanagawa, Japan

[21] Appl. No.: 873,300

[22] Filed: Jun. 9, 1986

Related U.S. Application Data

[63] Continuation of Ser. No. 543,558, Oct. 19, 1983, abandoned.

[30] Foreign Application Priority Data

Oct. 19, 1982 [JP] Japan ............................ 57-182172

[51] Int. Cl.⁴ .......................... G02B 26/10; H01J 3/28
[52] U.S. Cl. .................................. 250/235; 250/201;
250/227; 250/237 G; 350/6.6; 358/293
[58] Field of Search ............. 250/201, 227, 234, 235,
250/236, 237 G; 350/6.5, 6.6, 6.91; 358/285,
288, 293

[56] References Cited

U.S. PATENT DOCUMENTS

| | | | |
|---|---|---|---|
| 4,019,186 | 4/1977 | Dressen et al. | 250/227 |
| 4,216,378 | 8/1980 | Monette | 250/235 X |
| 4,329,011 | 5/1982 | Mori et al. | 250/236 X |
| 4,352,984 | 10/1982 | Ohara | 250/234 |

*Primary Examiner*—Edward P. Westin
*Attorney, Agent, or Firm*—Sughrue, Mion, Zinn, Macpeak & Seas

[57] ABSTRACT

A light beam scanning apparatus includes a sweeping unit for sweeping a light beam in response to a first signal. A photodetector has a plurality of optical gratings arranged in an array in a predetermined direction in which the light beam is swept. The photodetector generates a second signal in response to a movement of the light beam along the grating array. A control circuit generates the first signal in response to the second signal. The control circuit detects a scan speed of the light beam based on the second signal, and adjusts the first signal in response to the detected scan speed to control the scan speed of the light beam such that the detected scan speed substantially coincides with a predetermined speed.

6 Claims, 7 Drawing Figures

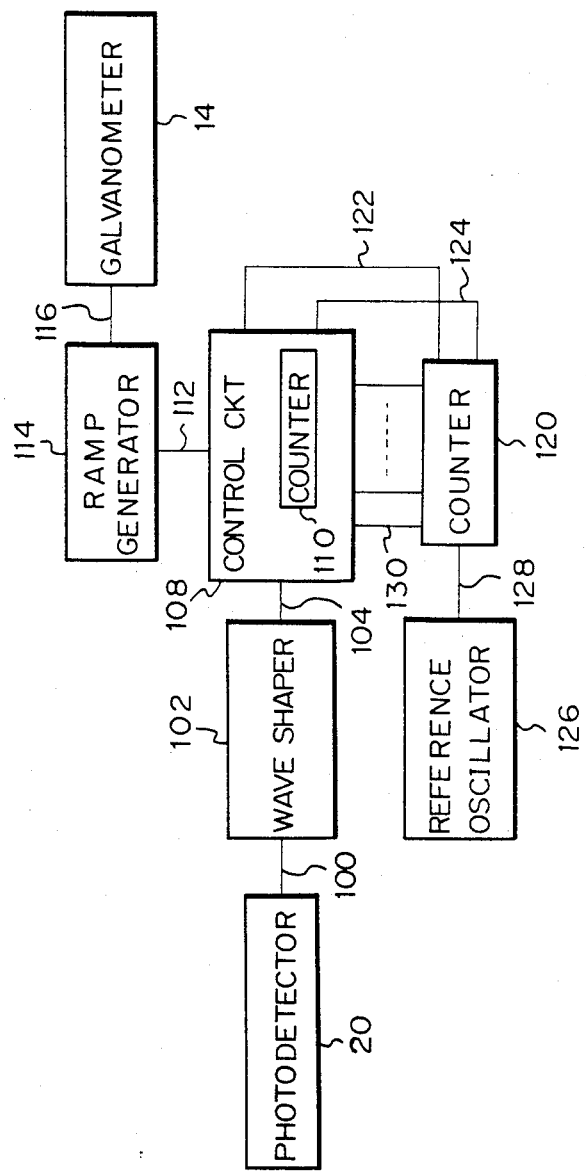

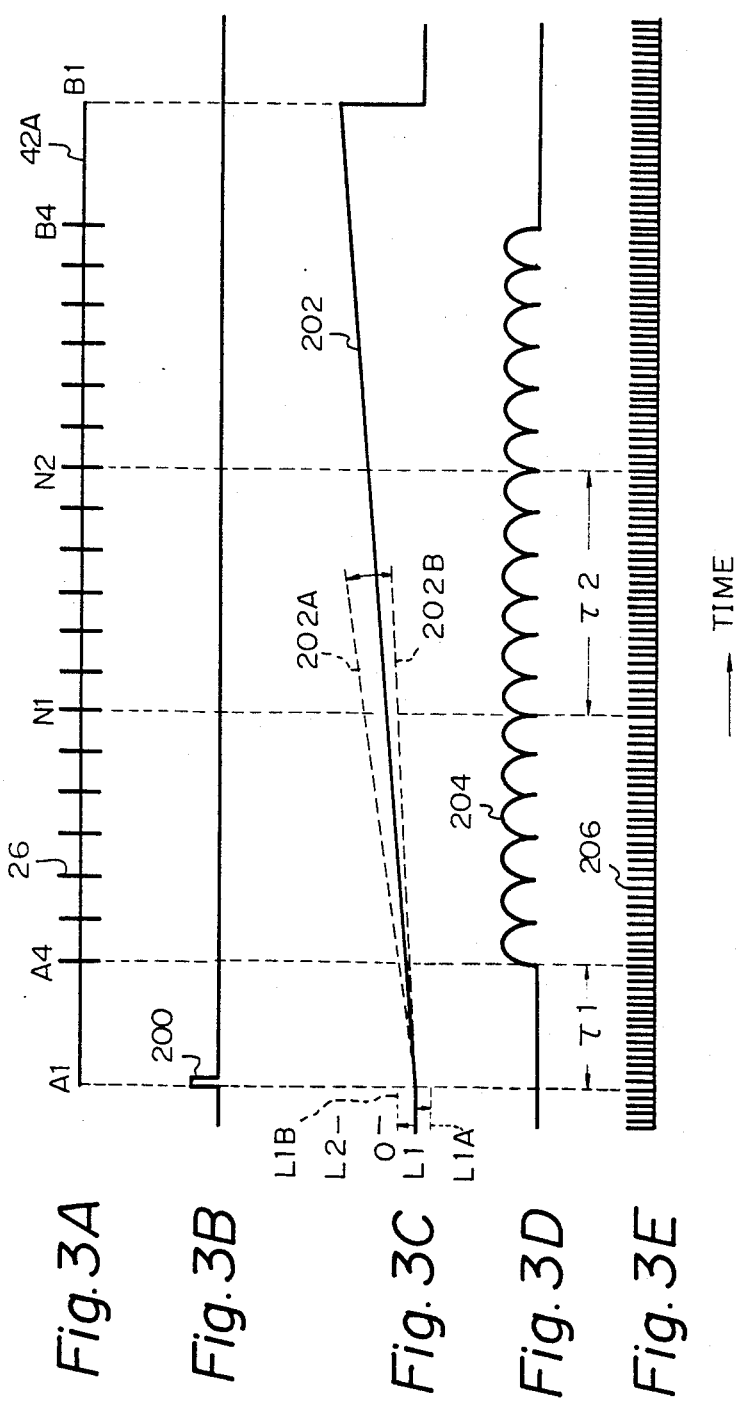

LIGHT BEAM SCANNING APPARATUS WITH ADJUSTABLE SCANNING SPEED AND OFFSET

This is a continuation of application Ser. No. 543,558 filed Oct. 19, 1983 now abandoned.

BACKGROUND OF THE INVENTION

1. Field of the Invention

The present invention relates to a light beam scanning apparatus and, more particularly, to a light beam scanning apparatus for sweeping a light beam to read out or record image information.

2. Description of the Prior Art

In the conventional light beam scanner, a light beam emitted from a light source such as a laser is reflected and swept by a mirror which is rotated by a galvanometer. Where such a device is applied to an image information recording system, the light beam is modulated in response to an image information signal using, for example, an acoustooptical modulator (AOM), and a photosensitive recording medium is scanned with the modulated beam to record the image information thereon. On the other hand, where the scanner is applied to an image information read-out or reproducing system, a medium carrying an image is scanned with the light beam and the light having passed through or reflected by the medium is detected to read out the information. Particularly, when a radiation image stored in a stimulable phosphor sheet is read out, the laser beam is used as stimulating rays, and the read out of the radiation image is performed by scanning the sheet with the laser beam and photoelectrically detecting the light emitted from the sheet to obtain signals corresponding to the radiation image.

Whether the light beam scanner of the type as described above is applied to an image information recording system or to an image information read out system, it is desirable that the light beam is swept at a constant speed.

In an image information recording system, for example, an image with a uniform quality can be recorded if exposure time per pixel is constant. In an image information read out system, on the other hand, an image can uniformly be reproduced if the integration time per pixel is constant.

However, such a scanner has the defect that it includes one or more mirrors, a galvanometer and other mechanically movable elements in its optics which cannot readily be brought to or held in optimal conditions by manual adjustment. For example, even a very small misalignment of a mirror greatly effects an offset of the light beam in the initial position. In addition, the influence of the fluctuation of ambient temperature on its optics is not negligible.

To set up a constant scanning speed and obtain an image of high quality, therefore, a system is desirable which requires minimum manual adjustment, and in which initial position offset of light beam, and the like can be automatically adjusted.

SUMMARY OF THE INVENTION

Therefore, an object of the present invention is to provide a light beam scanning apparatus requiring minimum manual adjustment in which optimal scanning conditions can be automatically set up and held.

In one aspect of the present invention, there is provided a light beam scanning apparatus which comprises sweeping means for sweeping a light beam in response to a first signal, a photodetector having an optical grating arranged in a direction in which the light beam is swept, and generating a second signal in response to the movement of the light beam along the grating, and control means for generating the first signal in response to the second signal, said control means detecting a scanning speed of the light beam based on the second signal, and adjusting the first signal in response to the detected scanning speed to control the scanning speed of the light beam such that the detected scanning speed substantially coincides with a predetermined speed.

In another aspect of the present invention, there is provided a light beam scanning apparatus which comprises sweeping means for sweeping a light beam in response to a first signal, a photodetector having an optical grating arranged in a direction in which the light beam is swept, and generating a second signal in response to the movement of the light beam along the grating, and control means for generating the first signal in response to the second signal, said control means controlling a position at which sweeping of the light beam starts by determining a period of time during which the light beam moves from a starting point of sweeping to the end of the grating array based on the second signal, and adjusting an initial level of the first signal in response to the determined period of time.

BRIEF DESCRIPTION OF THE DRAWINGS

The objects and features of the present invention will become more apparent from the following detailed description taken in conjunction with the accompanying drawings in which:

FIG. 2 is a schematic block diagram showing circuitry for controlling the apparatus shown in FIG. 1; and FIGS. 3A–3E show waveforms of the signals generated by the elements of the circuitry shown in FIG. 2.

DESCRIPTION OF THE PREFERRED EMBODIMENT

Figure 1:
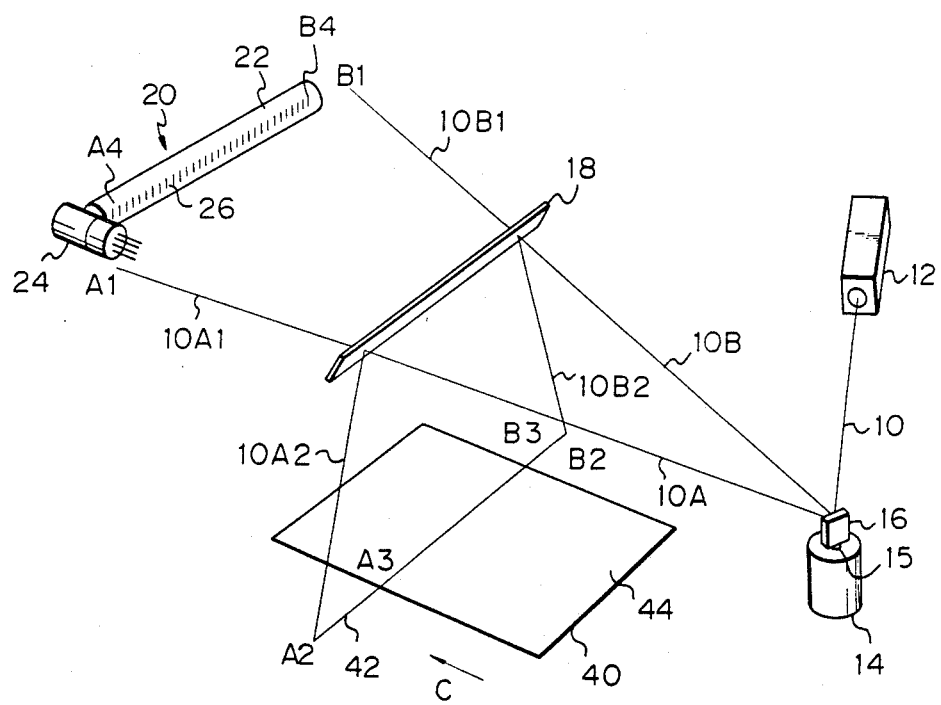
FIG. 1 is a schematic perspective view of light beam scanning apparatus in accordance with the present invention.

Referring to FIG. 1 of the drawings, a light beam scanning apparatus in accordance with the present invention is shown and generally comprises a light source 12 and a galvanometer 14. The light source 12 comprises a laser for generating a laser beam 10. The galvanometer 14 is adapted to sweep the light beam 10.

The galvanometer 14 has a rotary shaft 15 which carries a mirror 16 therewith and holds it in a mechanically neutral position when the galvanometer 14 is not driven. As the galvanometer 14 is driven, it allows the mirror 16 to rotate to opposite sides away from the neutral position in response to a drive current thereby sweeping the light beam 10 within the range of positions 10A and 10B. For example, the beam 10 may be swept toward the position 10A in response to a negative voltage and toward the position 10B in response to a positive voltage, while substantially remaining in the neutral position in response to zero voltage. As will be described, the negative or positive voltage level is variable to control the point of start or end of the beam scan over the range 10A–10B, and the rate of the voltage variation, i.e., the gradient in the case of linear variation, is variable to control the scan speed.

In this particular embodiment, a rectangular beam splitter or half-mirror 18 is located in a plane which contains the beams 10A and 10B. The beam splitter 18 splits the incident beam 10A into beams $10A_1$ and $10A_2$, and the incident beam 10B into beams $10B_1$ and $10B_2$, for example. The beams $10A_1$ and $10B_1$ are transmitted through the beam splitter 18 to advance straight to a photodetector 20. The beams $10A_2$ and $10B_2$, on the other hand, are reflected by the beam splitter 18 toward a recording medium 40. The recording medium 40 may comprise a sheet as illustrated which records pictures thereon, with or without characters included therein, the sheet being fed in a direction indicated by an arrow C by a feed mechanism, not shown. With this construction, the rotation of the mirror 16 caused by the galvanometer 14 allows the light beam to scan the sheet 40 in the horizontal scan direction to thereby define a scan line 42. Meanwhile, the beam scans the sheet 40 in the vertical scan direction in accordance with the feeding of the sheet 40. These in combination cause a raster scan on a recording surface 44 of the sheet 40.

Where the light beam scanner described above is applied to a data reading system, the beams $10A_2$ to $10B_2$ will be selectively reflected by or transmitted through the recording surface 44 thereby reading data out of the medium or sheet 40. Assuming a recording medium which includes a stimulable phosphor layer, the phosphor will be stimulated by the laser beams $10A_2$–$10B_2$ to allow radiation image information to be read thereoutof. Where the light beam scanner is applied to a recording system in which the recording medium 40 includes a radiation sensitive material, the beam 10 from the laser source 12 will be modulated by modulator means such as an acoustooptical modulator (AOM) in response to information signals thereby writing images into the radiation sensitive material.

The photodetector 20 is shown as comprising an elongate light conducting member 22 made of acrylic resin, for example, and having a substantially circular cross-section, and a light receiving device 24 such as a photomultiplier. As illustrated, a number of stripes 26 are formed in part of the circumference of the columnar light conductor 22 at substantially equally spaced locations along the longitudinal axis of the light conductor 22. The stripes 26 are made of chromium or like substance which manifests optically low transmissivity, constituting an array of optical grids, that is, a grating. As the beam is swept from the position $10A_1$ over to the position $10B_1$ to scan the array of gratings 26 on the light conductor 22, part of the light enterring the light conductor 22 propagates therethrough while being repeatedly reflected and diffused therein, until it becomes incident on the light receiving device 24. The light receiving device 24 transforms the incoming light into electric signals which correspond to the transparent and opaque sections of the gratings 26. That is, every time the beam $10A_1$–$10B_1$ scans one of the gratings 26, the quantity of light incident on the light conductor 22 is reduced, so that the light receiving device 24 produces an output having a waveform such as shown in FIG. 3D.

Assume that the width of the recording surface 44, that is, the effective length of the scan line 42 on the recording surface 44 (between $A_3$ and $A_4$), or effective scan line length, is about 300 millimeters. Then, the scan line 42 has about a 40 millimeter long margin at each side thereof, between $A_2$ and $A_3$ or between $B_3$ and $B_2$. Therefore, the total length of the scan line 42 is about 380 millimeters. About 1,500 stripes 26 are formed over the length of about 340 millimeters between opposite ends $A_4$ and $B_4$ of the grating. In this embodiment, one scan line is scanned in several tens of milliseconds.

Referring to FIG. 2, an example of circuitry for horizontal scan control will be described. In FIG. 2, the same structural elements as those shown in FIG. 1 are designated by the same reference numerals. An output 100 of the light receiving device 24 in the photodetector 20 is connected to a wave-shaping circuit 102. An output waveform 204 of the photodetector 24 such as shown in FIG. 3D is shaped by the circuit 102 with respect to a predetermined threshold value. The output of the wave shaper 102, which is a rectangular wave having two levels, is fed out to a lead 104.

The lead 104 from the wave shaper 102 is connected to a control circuit 108 which controls the operation of the whole system. A counter 110 is included in the control circuit 10B to count the reference pulses which are supplied thereto from the wave shaper 102 on the lead 104.

Connected with an output 112 of the control 108 is a ramp generator 114 which is adpated to generate a ramp function, i.e., a sawtooth wave 202 as shown in FIG. 3C. An output 116 of the ramp generator 114 is fed to the galvanometer 14. In response to the sawtooth wave 202, the galvanometer 14 rotates the mirror 16, FIG. 1, to sweep the beam 10 from positions 10A to 10B thereby forming the scan line 42. At the same time, the beam scans the grating 26 on the photodetector 20 to form a scan line 42A, FIG. 3A, corresponding to the grating 26. Favorable linearity is established between the signal coupled to the galvanometer, FIG. 3C, and the beam positions 10A–10B.

Signal waveforms appearing in various portions of the circuitry of FIG. 2 in response to the scan in the range 10A–10B are shown in FIGS. 3B–3E, in which the abscissa indicates time. The positions of the grating 26 are schematically shown in FIG. 3A in correspondence with the scan over the range 10A–10B. As will be described, with the scan speed is increased, the gradient of the sawtooth wave 202 in FIG. 3C becomes steeper as indicated by a phantom line 202A, and this will translate into a narrower spacing between the adjacent marks on the grating 26 than illustrated in FIG. 3A. The phantom line 202B represents a gradient provided by a lower scan speed in which case the spacing between adjacent gratings 26 will appear wider than illustrated. It should be noted that the number and pitch of the gratings shown in FIG. 3A as well as the number and duration of the pulses shown in FIGS. 3B–3E are for illustrative purpose only and shown each in a somewhat exaggerated schematic form for illustration.

In FIG. 2, the circuitry also includes a second counter 120 for counting reference pulses which a reference oscillator 126 feeds out to a lead 128. The second counter 120 has a gate which is enabled by a control signal supplied from the control 108 on a lead 122, and disabled by a control signal also supplied from the control 108 on a lead 124. The output of the counter 120 is fed to the control 108 over parallel output leads 130.

The reference oscillator 126 may comprise a quartz oscillator which generates a relatively stable frequency, delivering reference clock pulses 206 such as shown in FIG. 3E to the lead 128. The oscillation frequency of the oscillator 126 should preferably be higher than the frequency of the signal 204 produced from the photodetector 20, FIG. 3D, and, for example, about 1 MHz.

In order to preset the initial position 10A of the scanning beam shown in FIG. 1, the system of the illustrative embodiment controls the time period which the beam $10A_1$ coming into the photodetector 20 takes to move from the initial position $A_1$ to the position $A_4$ where the leftmost end (in FIG. 1) of the grating is located. Stated ankother way, in FIG. 3, the control 108 generates a sync pulse 200 shown in FIG. 3B which defines a timing for the rise of the sawtooth wave 202 for each of the scans over the range 10A–10B; reference clock pulses 206 are counted by the counter 120 for a time period $\tau_1$ from the instant of occurrence of a sync pulse 200 to the instant of arrival of the beam $10A_1$ at the grating 26 in the position $A_4$. The scan start point of the galvanometer 14, that is, the offset of the sawtooth wave 202 is then so adjusted as to make a count of the reference clock coincide with a predetermined number.

In more detail, the control 108 causes the ramp generator 114 to generate the sawtooth wave 202 in synchronism with a sync pulse 200, thereby causing the galvanometer 14 to start sweeping the beam 10A. At the same time, the control 108 supplies a control signal to the counter 120 on the lead 122 so that the counter 120 starts counting the incoming clock pulses 206. As soon as the beam $10A_1$ comes to the grating 26 at the leftmost position $A_4$, the first reference pulse 204 is fed from the photodetector 20 to the control 108 via the wave shaper 102. In response to this reference pulse 204, the control 108 supplies another control signal to the clock pulse counter 120 over the lead 124 so as to disable it. The control 108 reads a then existing count of the clock pulse counter 120 via the parallel output leads 130 to compare it with a predetermined reference number. Based on the result of comparison, the control 108 adjusts the offset $L_1$, FIG. 3C, of the ramp generator 114 to adjust the initial position of the galvanometer 14.

Assume that, as shown in FIG. 3C, the level of the sawtooth wave 202 corresponding to the mechanically neutral position of the galvanometer 14 is 0, and that the level of the wave 202 for locating the beam $10A_1$ at the start point $A_1$ is $L_1$. Then, the control 108 controls the initial position of the galvanometer by varying the level $L_1$ in response to the difference provided by the comparison. For example, the control 108 controls the ramp generator 114 such that the level $L_1$ is lowered (phantom line $L_{1A}$) when the time period $\tau_1$ shown in FIG. 3 is shorter than a predetermined value, and raised (phantom line $L_{1B}$) when it is longer than the predetermined value. In this manner, the control 108 determines the time period $\tau_1$ for each scan and varies the level of the sawtoothed wave 202 to bring the time period $\tau_1$ closer to the reference value, thereby adjusting the initial position of the galvanometer 14.

Now, the sweep speed for the beam 10A–10B depends on the gradient of the sawtooth wave 202, that is, the scan speed increases with the increase in the gradient and decreases with the decrease in the same. This is effected in this embodiment by determining the speed of the beam $10A_1$ while it moves over, for example, the section between $N_1$ and $N_2$ of the grating 26 in FIG. 3A, and thereby adjusting the gradient of the sawtooth wave 202. The section concerned should advantageously be the substantially central part of the marks on the grating array. Assuming that the total number of the grating 26 is 1,500, the position $N_1$ may preferably be defined by the 700th grating from the leftmost position $A_4$ and the position $N_2$ by the 800th grating. While the beam $10A_1$ scans this section $N_1$–$N_2$, a train of 100 pulses 204 are generated in in response and fed from the photodetector 20 to the control 108.

In detail, when the beam $10A_1$ enters the grating 26 from the leftmost end $A_4$ thereof, a reference pulse 204 corresponding to the grating 26 at the position $A_4$ is supplied to the control 108 to enable the counter 110. The counter 110 counts up reference pulses 204 which are subsequently supplied thereto from the photodetector 20 in response to the successive scans by the beam $10A_1$. As soon as the counter 110 counts up 700 pulses 204 at which time the beam $10A_1$ has arrived at the grating 26 at the position $N_1$, the control 108 produces a control signal on the lead 122 to enable counter 120. Then, the counter 120 starts counting the reference clock 206 provided from the reference oscillator 126 again.

When the counter 110 is incremented to a predetermined count "100" in response to the sequentially incoming pulses 204, which represents the arrival of the beam $10A_1$ at the grating 26 in the position $N_2$, the control 108 delivers a control signal to the counter 120 on the lead 124 to disable it. The control 108 reads the then existing count of the clock pulses 206 (corresponding to a time period $\tau_2$ in FIG. 3) out of the clock pulse counter 120 via parallel leads 130 to compare it with a predetermined value.

Based on the result of comparison, the control 108 controls the ramp generator 114 to vary the gradient of the sawtooth wave 202. For example, the comparison shows that the period of time $\tau_2$ during which the beam $10A_1$ moves from the position $N_1$ to the position $N_2$, FIG. 3, is shorter than the reference time, the control 108 commands the ramp generator 114 to reduce the gradient of the sawtoothed wave 202 (to the phantom-line gradient 202B); if the time $\tau_2$ is longer than the reference time, to increase the gradient (to the phantom-line gradient 202A). In this manner, determining the time $\tau_2$ for each scan, the control 108 repeats the adjustment of the sawtooth wave gradient once for each respective scan until the scan speed converges to a predetermined level. Therefore, where the apparatus of the present invention is applied to the previously discussed radiation image reading system, the integration time per pixel in the course of the readout operation can be maintained constant by effecting the method concerned before reading each image. Likewise, where it is applied to the image recording system, the exposure time per pixel during recording can be maintained constant by practicing the above-described method before recording each image. Images, therefore, can be recorded and read out with a desirable quality.

The apparatus in accordance with the present invention monitors and adjusts the initial position and moving speed of a beam based on the actual scanning condition thereof, allowing various kinds of fluctuations such as temperature drift in the beam scan system to be readily compensated for. The compensation is quite efficient because it needs no manual operation. While significant accuracy has heretofore been required and implemented by manipulation in the assembly of such an apparatus, the present invention accommodates roughness concerning that part of the adjustment which relies on manipulation, because the fine adjustment is automatically achieved with the feedback circuitry shown in FIG. 2. This cuts down the number of steps required for manufacturing the apparatus.

Various modifications will become possible for those skilled in the art after receiving the teachings of the present disclosure without departing from the scope thereof. For example, although the beam for scanning the recording medium and that for monitoring and controlling the scans have been provided by a beam splitter 18, a single beam may be switched from one optical path to the other to scan the recording medium and control the scans selectively. If desired, even two different light sources may be employed to generate the two beams. While a single counter has been employed to function for both the offset detection and speed detection, it may of course be replaced by two independent counters.

What is claimed is:

1. A light beam scanning apparatus comprising:
   means for sweeping a light beam in response to a ramp signal;
   means for dividing the swept light beam into first and second portions, said first portion being directed onto a medium to be scanned;
   an optical grating disposed in the path of said second portion and extending in a direction of sweep of said second portion;
   light detecting means receiving light passing through said optical grating for producing a detection signal having a pulse for each time said second portion crosses a line of said grating;
   a reference oscillator for producing reference clock pulses having a frequency greater than a frequency of said pulses of said detection signal;
   a first counter for counting said reference clock pulses;
   a second counter for counting said pulses of said detection signal; and
   control means for enabling said first counter to count said reference clock pulses when said second counter has reached a first predetermined count of said pulses of said detection signal and disabling said first counter from counting said pulses of said detection signal when said second counter has reached a second predetermined count of said pulses of said detection signal, said first and second predetermined counts corresponding to boundaries of a reference region along said grating, and adjusting a slope of said ramp signal in response to a count reached by said first counter when said second counter has reached said second predetermined count to thereby maintain a scan speed of said beam substantially constant.

2. The light beam scanning apparatus of claim 1, wherein said control means further enables said first counter when said beam sweeping means starts sweeping said beam and disables said second counter when a first pulse of said detection signal is produced when said second portion of said beam enters said grating and adjusts an offset level of said first signal in response to a count reached by said first counter when said first pulse of said detector signal is produced.

3. The light beam scanning apparatus of claim 2, wherein said reference region is located at substantially a center portion of said grating.

4. The light beam scanning apparatus of claim 1, wherein said detector grating comprises an elongated light conducting member having grating lines formed along a longitudinal axis thereof.

5. The light beam scanning apparatus of claim 4, wherein said detecting means is disposed at one end of said light conducting member.

6. The light beam scanning apparatus of claim 1, further comprising wave shaping means coupled in series with an output of said detecting means.

* * * * *